United States Patent
Arakawa et al.

(10) Patent No.: US 12,248,090 B2
(45) Date of Patent: Mar. 11, 2025

(54) COMMUNICATION DEVICE AND COMMUNICATION METHOD

(71) Applicant: Murata Manufacturing Co., Ltd., Nagaokakyo (JP)

(72) Inventors: Nobuya Arakawa, Nagaokakyo (JP); Katsuhisa Kashiwagi, Nagaokakyo (JP); Ryo Saito, Nagaokakyo (JP); Koichi Ichige, Yokohama (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 368 days.

(21) Appl. No.: 17/966,898

(22) Filed: Oct. 17, 2022

(65) Prior Publication Data
US 2023/0032458 A1    Feb. 2, 2023

Related U.S. Application Data

(63) Continuation of application No. PCT/JP2021/014858, filed on Apr. 8, 2021.

(30) Foreign Application Priority Data

Apr. 17, 2020  (JP) ................. 2020-074297

(51) Int. Cl.
*G01S 7/35* (2006.01)
*G01S 13/42* (2006.01)

(52) U.S. Cl.
CPC .............. *G01S 7/354* (2013.01); *G01S 13/42* (2013.01)

(58) Field of Classification Search
CPC ................... G01S 7/354; G01S 13/42

(Continued)

(56) References Cited

U.S. PATENT DOCUMENTS 7,450,067 B2 * 11/2008 Xin ........................... G01S 3/74
                                                                      702/196
7,474,252 B2 *  1/2009 Natsume ................. G01S 13/34
                                                                       342/70

(Continued)

FOREIGN PATENT DOCUMENTS

JP       2000121716 A  *  4/2000   ............... G01S 3/74
JP       2001281316 A  * 10/2001   ............... G01S 3/74

(Continued)

OTHER PUBLICATIONS

International Search Report and Written Opinion mailed on Jun. 29, 2021, received for PCT Application PCT/JP2021/014858, filed on Apr. 8, 2021, 8 pages including English Translation.

*Primary Examiner* — Nuzhat Pervin
(74) *Attorney, Agent, or Firm* — XSENSUS LLP

(57) ABSTRACT

A communication device is capable of estimating an incoming wave number with high accuracy. A communication device includes an antenna and circuitry configured to calculate an arrival direction of a reception signal received from the antenna in a case of a predetermined incoming wave number based on the reception signal and the predetermined incoming wave number, calculate an incoming signal for each of one or more arrival directions in a case of a certain incoming wave number based on the incoming wave number and the one or more arrival directions, and estimate an incoming wave number of the reception signal based on levels of the incoming signals in a plurality of arrival directions.

20 Claims, 6 Drawing Sheets

(58) Field of Classification Search
USPC .......................................................... 342/146
See application file for complete search history.

(56) References Cited

U.S. PATENT DOCUMENTS

| | | | | |
|---|---|---|---|---|
| 7,535,822 B2* | 5/2009 | Geile | ..................... | H04H 20/79 |
| | | | | 375/147 |
| 10,145,949 B2* | 12/2018 | Kishigami | ................. | G01S 7/28 |
| 10,386,472 B2* | 8/2019 | Asanuma | ................ | G01S 13/584 |
| 10,935,633 B2* | 3/2021 | Maher | ................... | G01S 13/06 |
| 11,086,010 B2* | 8/2021 | Davis | ....................... | G01S 7/023 |
| 11,156,696 B2* | 10/2021 | Kitamura | ................ | G01S 7/032 |
| 11,209,523 B2* | 12/2021 | Meissner | ................ | G01S 13/53 |
| 2010/0271254 A1* | 10/2010 | Kanamoto | ............ | G01S 13/931 |
| | | | | 342/146 |
| 2012/0249359 A1* | 10/2012 | Kurono | ................ | G01S 13/345 |
| | | | | 342/147 |

FOREIGN PATENT DOCUMENTS

| | | | | | |
|---|---|---|---|---|---|
| JP | 2002-148324 A | | 5/2002 | | |
| JP | 2004198218 A | * | 7/2004 | ............... | G01S 3/74 |
| JP | 4401526 B2 | * | 1/2010 | ............... | G01S 3/74 |
| WO | WO-2008105748 A1 | * | 9/2008 | ............... | G01S 3/14 |

* cited by examiner

COMMUNICATION DEVICE AND COMMUNICATION METHOD

CROSS REFERENCE TO RELATED APPLICATIONS

The present application is a continuation of PCT/JP2021/014858, filed Apr. 8, 2021, which claims priority to Japanese patent application JP 2020-074297, filed Apr. 17, 2020, the entire contents of each of which being incorporated herein by reference.

TECHNICAL FIELD

The present disclosure relates to a communication device and a communication method.

BACKGROUND ART

Radio waves are used for object detection and information communication. Radars are used for the object detection. For example, there is a radar in which a reflection wave generated by reflection of a transmission wave from a target object is received as an incoming wave with an array antenna. As such a radar, a Frequency Modulated Continuous Wave (FMCW) radar is cited. In radars that perform electronic scanning, such as the FMCW radar, various arrival direction estimation methods are used as a technique for detecting the arrival direction of an incoming wave. Also in information communication, the arrival direction of an incoming wave to a communication device is estimated in order to improve the efficiency of communication.

There is a method of estimating an incoming wave number, which means the number of incoming waves, and using the estimated incoming wave number to estimate the arrival direction. As an example of such an arrival direction estimation method, there is a MUltiple SIgnal Classification (MUSIC) method. The MUSIC method is a method classified as a super-resolution algorithm among arrival direction estimation methods. The radio wave arrival direction estimation device described in Patent Document 1 estimates an arrival direction candidate by a linear prediction method, calculates an output power of an array antenna for the arrival direction candidate by a Capon method, and estimates an incoming wave number based on the output power. The radio wave arrival direction estimation device described in Patent Document 1 estimates an arrival direction from the incoming wave number and the arrival direction candidate.

CITATION LIST

Patent Document

Patent Document 1: Japanese Unexamined Patent Application Publication No. 2002-148324

SUMMARY

Technical Problems

As disclosed in Patent Document 1, in a case where an arrival direction is estimated using the linear prediction method, when an incoming wave is a correlation wave and the correlation of a reception signal by the array antenna is high, the estimation accuracy of the arrival direction significantly decreases. For this reason, there is a problem that the estimation accuracy of the incoming wave number also decreases.

Thus, an object of the present disclosure is to provide a communication device capable of estimating an incoming wave number with high accuracy.

Solution to Problems

A communication device according to the present disclosure includes an antenna and circuitry configured to: calculate an arrival direction of a reception signal received from the antenna in a case of a predetermined incoming wave number based on the reception signal and the predetermined incoming wave number; calculate an incoming signal for each of one or more arrival directions in a case of an incoming wave number based on the incoming wave number and the one or more arrival directions; and estimate an incoming wave number of the reception signal based on levels of the incoming signals in a plurality of the arrival directions.

A communication method according to another aspect of the present disclosure includes, by a communication device, calculating an arrival direction of a reception signal received from an antenna in a case of a predetermined incoming wave number based on the reception signal and the predetermined incoming wave number, calculating an incoming signal for each of one or more arrival directions in a case of an incoming wave number based on the incoming wave number and the one or more arrival directions, and estimating an incoming wave number of the reception signal based on levels of the incoming signals in a plurality of the arrival directions.

Advantageous Effects

According to the present disclosure, it is possible to provide the communication device capable of estimating the incoming wave number with high accuracy.

DESCRIPTION OF EMBODIMENTS

Figure 1:
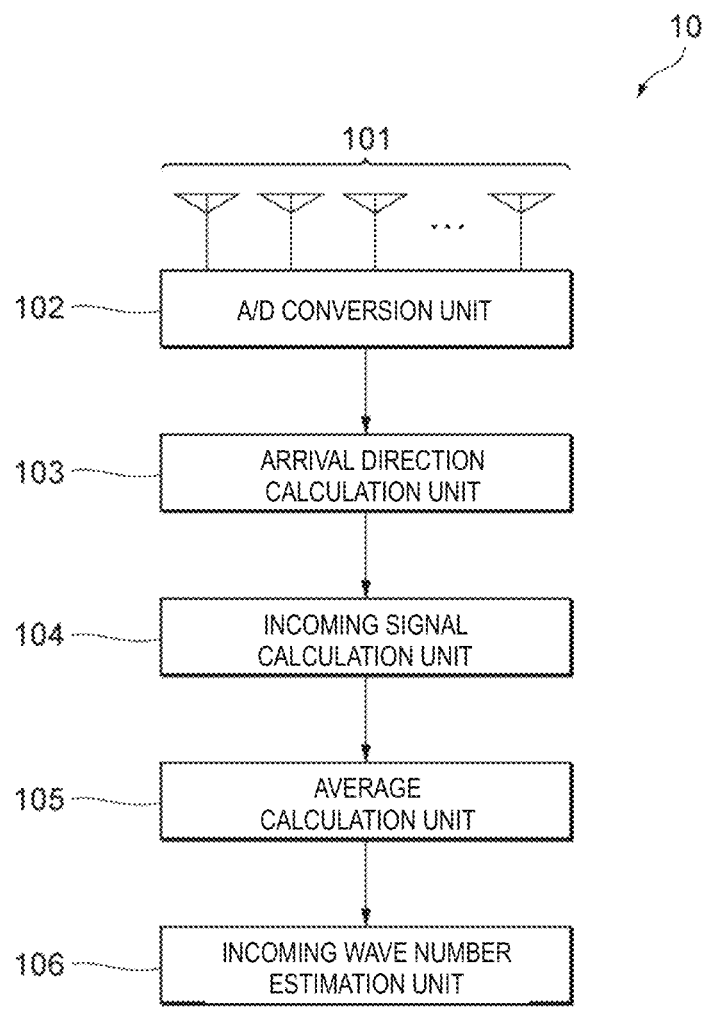
FIG. 1 is a block diagram of a communication device according to a first embodiment.

Hereinafter, embodiments of the present disclosure will be described in detail with reference to the drawings. Note that the same constituent elements are denoted by the same reference sign and overlapping description will be omitted as much as possible.

A communication device 10 according to a first embodiment will be described. The communication device 10 according to the first embodiment includes an antenna 101, an A/D conversion unit 102, an arrival direction calculation unit 103, an incoming signal calculation unit 104, an average calculation unit 105, and an incoming wave number estimation unit 106. Each of A/D conversion unit 102, arrival direction calculation unit 103, incoming signal calculation unit 104, average calculation unit 105, and incoming wave number estimation unit 106 includes processing circuitry, such as a programmable processor (e.g., CPU) and memory that holds the program instructions, and/or dedicated logic such as an application specific integrated circuit (ASIC).

The antenna 101 is an array antenna in which a plurality of antenna elements is disposed along a predetermined direction. A signal is input to the antenna 101 from the outside, and a reception signal is output from the antenna 101 to the A/D conversion unit 102. The reception signal is output from each antenna element. The antenna 101 may be capable of both receiving and transmitting signals.

The A/D conversion unit 102 converts the reception signal, which is an analog signal, from the antenna 101 into a digital signal. A general analog-digital conversion circuit can be used as the A/D conversion unit 102. For example, as the analog-digital conversion circuit, various types such as a flash type, a pipeline type, a successive approximation type, a delta-sigma type, and a double integration type can be used.

The arrival direction calculation unit 103 calculates an arrival direction based on a certain incoming wave number by a method included in a super-resolution algorithm such as an Annihilating Filter (AF) method, for example.

The incoming signal calculation unit 104 calculates an incoming signal based on the arrival direction calculated by the arrival direction calculation unit 103. A relationship among reception signals and incoming signals for arrival directions is expressed by Equation (1).

[Math. 1]

$$\begin{bmatrix} 1 & 1 & \cdots & 1 \\ z_1^1 & z_2^1 & \cdots & z_k^1 \\ \vdots & \vdots & \ddots & \vdots \\ z_1^{M-1} & z_2^{M-1} & \cdots & z_k^{M-1} \end{bmatrix} \begin{bmatrix} A_1 e^{j\alpha_1} \\ A_2 e^{j\alpha_2} \\ \vdots \\ A_k e^{j\alpha_k} \end{bmatrix} = \begin{bmatrix} X(1) \\ X(2) \\ \vdots \\ X(M) \end{bmatrix} \quad (1)$$

Here, $z_1$ to $z_k$ are phase differences between antennas corresponding to the arrival direction of a signal for M antenna elements of the antenna 101 calculated by the AF method. The number of rows of the vector on the left side is an incoming wave number k. The matrix on the left side is a matrix of M rows and k columns. The number of rows of the vector on the right side is M. Component vectors X(1) to X(M) on the right side are reception signals corresponding to M antennas. The vector on the left side is a vector representing incoming signals by the products of amplitudes A and phases α represented in complex representation that correspond to the incoming wave number.

The incoming signal calculation unit 104 performs a matrix operation using an inverse matrix of the matrix on the left side of Equation (1) to calculate the incoming signals. Next, the incoming signal calculation unit 104 calculates a reception signal corresponding to the arrival directions for each of the plurality of antenna elements of the antenna 101.

The average calculation unit 105 calculates an average incoming signal by averaging the incoming signals for each arrival direction by using the incoming wave number used for estimation of incoming signals. The process of calculating the average will be described later.

The incoming wave number estimation unit 106 estimates the incoming wave number of the reception signal based on the level of the incoming signal in each arrival direction. Estimation processing of the incoming wave number by the incoming wave number estimation unit 106 will be described later.

Figure 2:
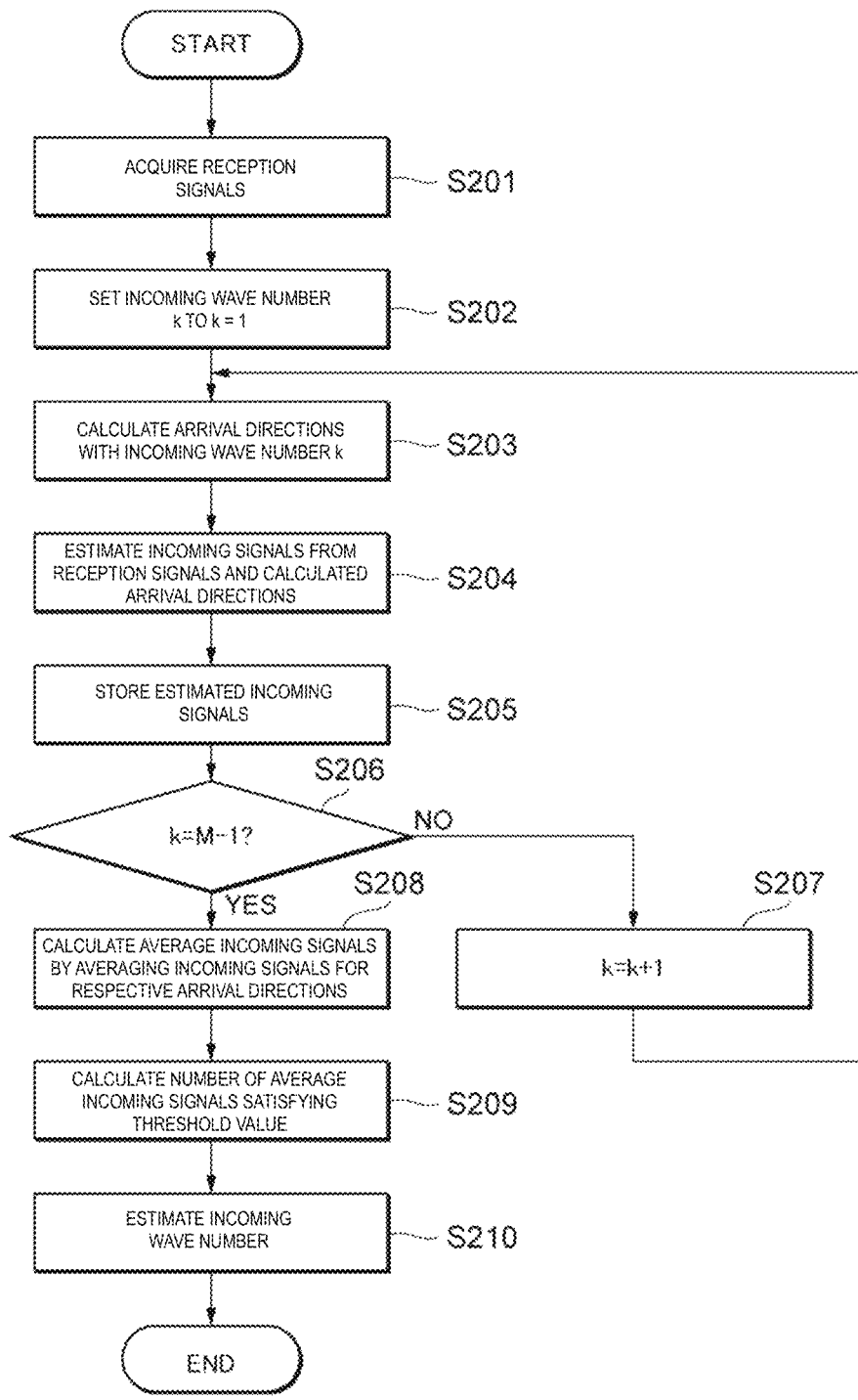
FIG. 2 is a flowchart of processing in the communication device according to the first embodiment.

A process of estimating the incoming wave number by the communication device 10 will be described with reference to FIG. 2 to FIG. 4. FIG. 2 is a flowchart of processing in the communication device 10. In step S201, the antenna 101 acquires reception signals. The acquired reception signals are converted into digital signals by the A/D conversion unit 102.

In step S202, the arrival direction calculation unit 103 sets an incoming wave number k to k=1. In step S203, the arrival direction calculation unit 103 calculates arrival directions based on the incoming wave number k.

In step S204, the incoming signal calculation unit 104 calculates incoming signals for the respective arrival directions from the reception signals and the calculated arrival directions.

In step S205, the incoming signal calculation unit 104 stores the calculated incoming signals for the respective arrival directions in association with the incoming wave number k used for the calculation of the incoming signals.

In step S206, the average calculation unit 105 determines whether k is M−1.

When a negative determination is made in step S206, the average calculation unit 105 increments k by 1 in step S207. Based on the incremented k, the processing from step S203 to step S207 is repeated until k=M−1 is satisfied. That is, based on the assumption that incoming wave number is plural, the calculation of the arrival directions and the calculation of the incoming signals for the respective arrival directions are performed and stored in the average calculation unit 105.

When a positive determination is made in step S206, the average calculation unit 105 calculates average incoming signals by averaging the incoming signals for the respective arrival directions in step S208.

Figure 3:
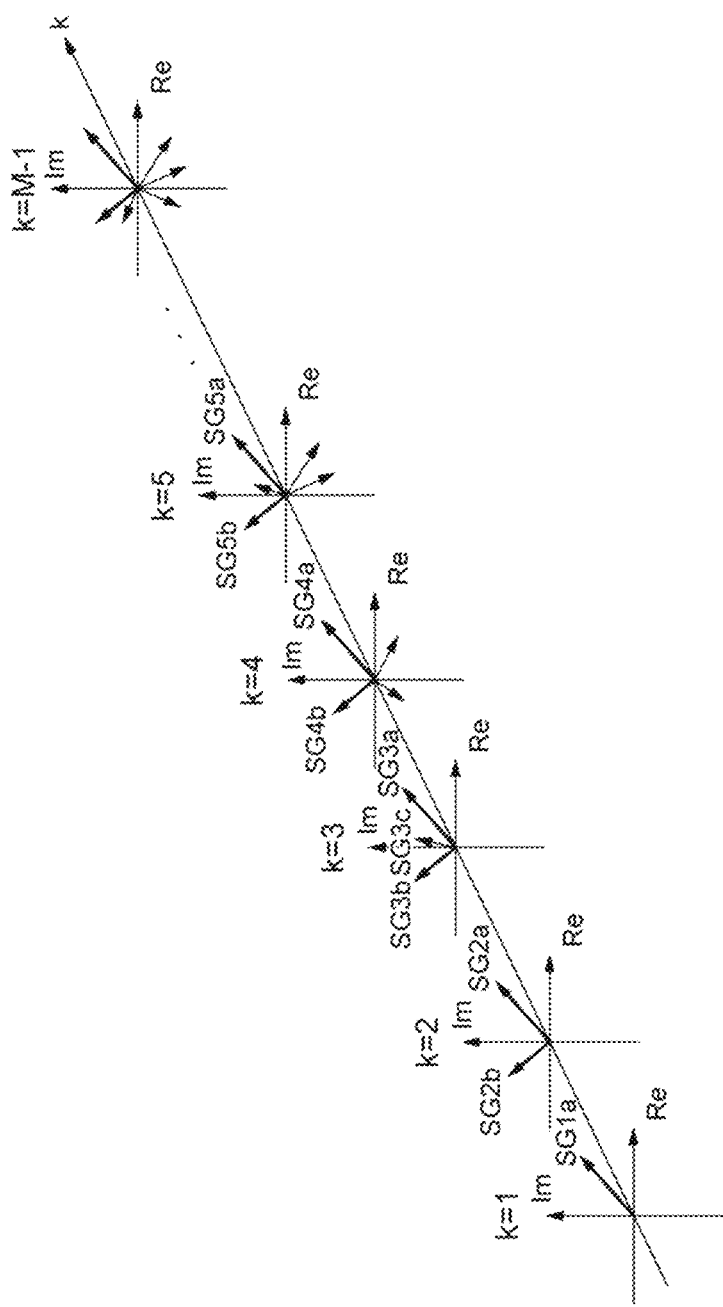
FIG. 3 is a diagram illustrating complex representation of incoming signals in the communication device according to the first embodiment.
Figure 4:
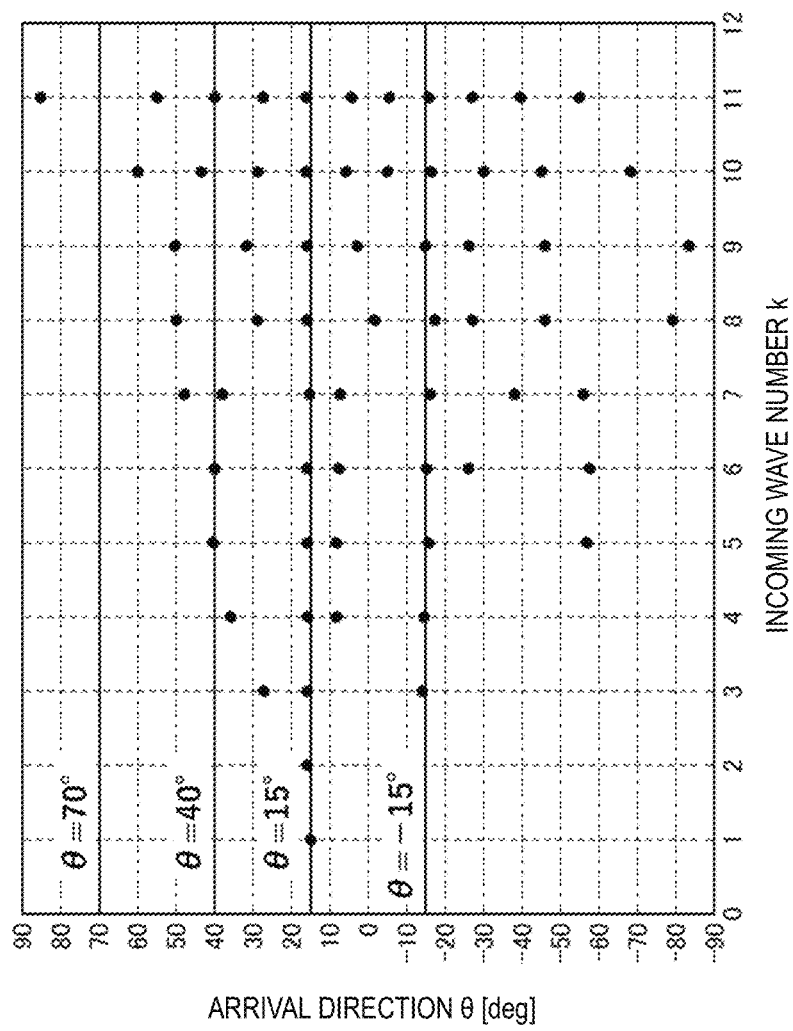
FIG. 4 is a graph showing an example of a wave number and an arrival direction in the communication device according to the first embodiment.

With reference to FIG. 3 and FIG. 4, the averaging processing of the incoming signals for the respective arrival directions will be described. In FIG. 3, each power of the incoming signals corresponding to the incoming wave number k is calculated by the incoming signal calculation unit 104, and a plurality of graphs in which the power is expressed by using complex notation are illustrated in series. Here, it is assumed that two incoming waves are received by the antenna 101. In a case of the incoming wave number k=1, there is one incoming signal, and one vector SG1*a* is expressed. In a case of k=2, there are two incoming signals and two vectors are expressed.

In a case of k=3, the incoming wave number is actually two, but each power is calculated on the assumption that there are three incoming waves. Thus, the power due to the incorrect incoming wave number is calculated. Here, a power vector generated due to the incorrect incoming wave number is referred to as an artifact. At this time, in the complex notation of the power in the case of k=3, in addition to vectors SG3*a* and SG3*b*, a vector SG3*c* is calculated as an artifact.

In a case of k=4, two artifacts appear. In a case of k=M−1, artifacts of the number obtained by subtracting an actual number of incoming waves from k are generated. A vector corresponding to an incoming wave has a constant phase and amplitude even when the incoming wave number k changes, whereas the phase of an artifact is random, and the amplitude thereof has a smaller value than that in the case of the incoming wave.

FIG. 4 is a diagram in which arrival directions θ of incoming waves to the antenna 101 are plotted when the incoming wave number k is changed based on reception signals from two objects that generate incoming waves. A point is displayed at a position corresponding to the phase of each power vector in FIG. 3.

For example, in a case of k=1, a point is plotted near θ=15°. In the case of k=1, the arrival direction of an incoming wave from the target object closer to the antenna is calculated. In a case of k=2, points are plotted near θ=15° and θ=−15°. In the case of k=2, the detection of the arrival directions of the signals corresponding to the incoming waves is completed. In a case of k=3 to 11, an artifact is plotted in addition to the incoming waves from the target objects.

The average calculation unit 105 acquires the incoming signals in a certain arrival direction θ over the respective incoming wave numbers k. That is, the incoming signals for each arrival direction is acquired. The arrival direction has a certain angular width, and an incoming signal included within the range thereof is acquired.

The incoming signal is acquired as, for example, a power value. In FIG. 4, in a case of θ=15°, the power value of the incoming signal is acquired for each incoming wave number from k=1 to k=11. In the case of θ=40°, the power value of the incoming signal that is not zero is acquired for each incoming wave number of k=5 to 7 and k=10 and 11. For each of the remaining incoming wave numbers k, the power value is acquired as 0. For the incoming signal in the case of θ=40°, the power value of an artifact is acquired. As in the case of θ=70°, it may be considered that the power value of the incoming signal that is not zero is not acquired.

The average calculation unit 105 calculates an average of the acquired incoming signals to calculate an average incoming signal. In the case of θ=15°, the average value is obtained by dividing the total of the acquired power values by the incoming wave number of 11. Also in the case of θ=40°, the average value is calculated by dividing the total of the acquired power values by the incoming wave number of 11.

The calculated average incoming signal has a value holding a constant magnitude because the value corresponding to the incoming signal takes a stable value regardless of the incoming wave number when not being an artifact, that is, when being a correct incoming wave. On the other hand, the average incoming signal corresponding to the artifact has a small value when averaged over the incoming wave number because the value corresponding to the incoming signal is random.

In step S209, the incoming wave number estimation unit 106 calculates the number of average incoming signals satisfying a predetermined threshold value from the average incoming signals calculated for the respective arrival directions. That is, the number of signals whose average incoming signal is larger than a predetermined threshold value is calculated.

In step S210, the incoming wave number estimation unit 106 estimates the number of arrival angles satisfying a threshold value as the incoming wave number of the incoming waves. In the example of FIG. 4, the number of incoming waves is two.

The communication device 10 can calculate the number of arrival directions that do not include an artifact by repeatedly calculating incoming signals based on the assumption of the incoming wave number and averaging the calculated incoming signals and can more accurately estimate the incoming wave number.

Note that the incoming wave number k to be used for calculation of the arrival directions is not necessarily changed from 1 to M−1, and may be changed by a number sufficient for estimation of the incoming wave number.

Alternatively, the arrival direction calculation unit 103 may use an arrival direction calculation method different from the AF method. For example, the arrival direction calculation unit 103 may use a Method Of Direction Estimation (MODE).

In addition, the incoming wave number estimation unit 106 may estimate the incoming wave number by a processing different from averaging signals for the respective incoming wave numbers. For example, the incoming wave number may be estimated based on only the number of incoming signals for each arrival direction as the signals for the incoming wave in a case of having the large number with a threshold value of the number.

Further, the incoming wave number estimation unit 106 may use an amplitude instead of the power as the threshold value of the average incoming signal.

In addition, the incoming wave number estimation unit 106 may estimate the incoming wave number by using a threshold value calculated by Constant False Alarm Rate processing.

A second embodiment will be described. In the second and subsequent embodiments, description of matters common to those of the first embodiment will be omitted, and only different points will be described. In particular, similar functions and effects due to similar configurations will not be described in detail for each embodiment.

Figure 5:
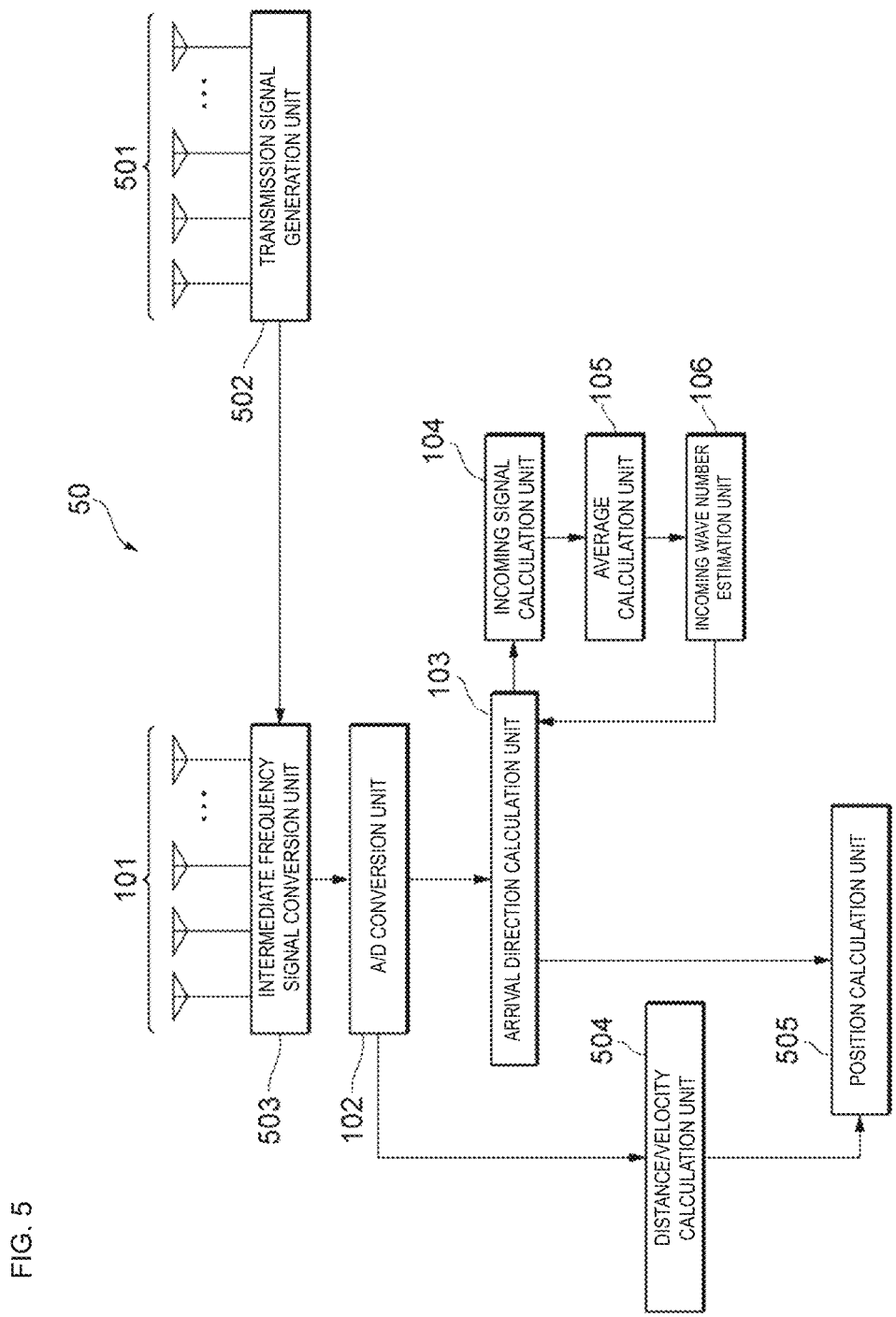
FIG. 5 is a block diagram of a communication device according to a second embodiment.

FIG. 5 is a block diagram of a communication device 50 according to the second embodiment. The communication device 50 includes a transmission antenna 501, a transmission signal generation unit 502, an intermediate frequency signal conversion unit 503, a distance/velocity calculation unit 504, and a position calculation unit 505 in addition to the respective units of the communication device 10. In addition, the antenna 101 is an example of a reception antenna that receives an incoming wave. Each of transmission signal generation unit 502, intermediate frequency signal conversion unit 503, distance/velocity calculation unit 504, and position calculation unit 505 includes processing circuitry, such as a programmable processor (e.g., CPU) and memory that holds the program instructions, and/or dedicated logic such as an application specific integrated circuit (ASIC).

In the communication device 50, the arrival direction calculation unit 103 calculates arrival directions based on the incoming wave number estimated by the incoming wave number estimation unit 106 and outputs the arrival directions to the position calculation unit 505, which will be described later.

The transmission antenna 501 is an array antenna including a plurality of antenna elements. The transmission antenna 501 transmits a transmission wave to the outside of the communication device 50. The transmission wave is a wave whose frequency linearly increases with the lapse of time. In other words, the communication device 50 is an example of a radar using an FMCW method.

The transmission signal generation unit 502 generates a transmission signal for generating a transmission wave to be transmitted by the transmission antenna 501. The transmission signal is a chirp signal that linearly increases the frequency of the transmission wave. The transmission signal is a signal including a plurality of chirp signals whose frequencies increase in the same manner.

The intermediate frequency signal conversion unit 503 calculates an intermediate frequency signal between the reception signal and the transmission signal based on the reception signal from the antenna 101 and the transmission signal from the transmission signal generation unit. The reception signal has a waveform obtained by time-delaying the chirp signal that is the transmission signal. The intermediate frequency signal is a difference between the frequency of the transmission signal and the frequency of the reception signal at a certain time. That is, the calculated intermediate frequency signal is a signal in which a certain constant frequency continues over a certain period of time. The intermediate frequency signal is converted into a digital signal by the A/D conversion unit 102 and output to the distance/velocity calculation unit 504.

Based on the intermediate frequency signal, the distance/velocity calculation unit 504 calculates the distance and velocity of a target object that has reflected the transmission wave, from the communication device 50. In calculating the distance, the distance to the target object is calculated on the assumption that the frequency difference between the transmission signal and the reception signal corresponding to the transmission signal, that is, the frequency of the intermediate frequency signal, corresponds to the time until the transmission wave is reflected by the target object and is input to the antenna 101 as an incoming wave. When there are a plurality of target objects, the distance/velocity calculation unit 504 converts the intermediate frequency signal into a frequency domain by Fourier transform or the like, and calculates a distance for each of intermediate frequencies, thereby calculating the distance to each target object.

Further, when the distance/velocity calculation unit 504 calculates the velocity, the velocity of the target object is calculated based on a phase difference between an intermediate frequency signal based on one chirp signal and an intermediate frequency signal based on another chirp signal. When there are a plurality of target objects, the velocity of each target object is calculated by further performing a Fourier transform (Doppler FFT) on the result of a Fourier transform (distance FFT) of an intermediate frequency signal performed for a certain target object.

The position calculation unit 505 calculates the position of the target object based on the distance and velocity of the target object calculated by the distance/velocity calculation unit 504 and the direction of the target object calculated by the arrival direction calculation unit 103.

With the communication device 50, since the wave number estimation with high accuracy is performed by the incoming wave number estimation unit 106, the resolution and accuracy are improved as a radar.

Figure 6:
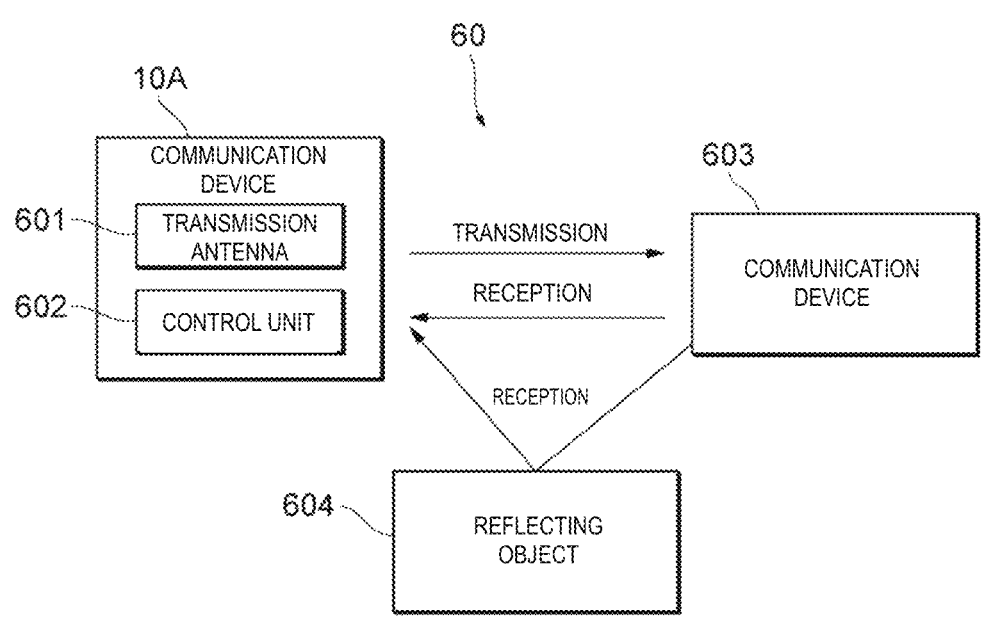
FIG. 6 is a schematic view of a communication system including a communication device according to a third embodiment.

A third embodiment will be described. FIG. 6 illustrates a schematic view of a communication system 60. The communication system 60 includes a communication device 10A and a communication device 603. The communication device 10A includes a transmission antenna 601 and a control unit 602 in addition to each unit of the communication device 10 according to the first embodiment. An antenna (not illustrated) in the communication device 10A is an example of a reception antenna that receives an incoming wave. When receiving a signal from the communication device 603, the communication device 10A estimates an arrival direction based on the incoming wave number estimated by the incoming wave number estimation unit 106. The control unit 602 can direct a peak of the directivity of the antenna toward the estimated arrival direction. Due to this, the communication device 10A can efficiently receive a signal from the communication device 603, and the communication efficiency is improved. The control unit 602 can also control the directivity of the transmission antenna 601 so as to strongly direct a transmission wave toward the communication device 603. Control unit 602 includes processing circuitry, such as a programmable processor (e.g., CPU) and memory that holds the program instructions, and/or dedicated logic such as an application specific integrated circuit (ASIC).

Note that an incoming wave received by the communication device 10A may include a multipath wave generated by being reflected by a reflecting object 604 or an interference wave, in addition to a direct wave directly arriving from the communication device 603. Also in this case, the communication device 10A can accurately estimate the incoming wave number.

As an example of the communication system 60, there is a system in which the communication devices 10A is a portable communication device such as a smartphone, and the communication device 603 is an apparatus that transmits a radio wave as a base station through which the communication device 10A connects to a network.

Exemplary embodiments of the present disclosure have been described above. A communication device 10 includes an antenna 101, an arrival direction calculation unit 103 configured to calculate an arrival direction of a reception signal received from the antenna 101 in a case of a predetermined incoming wave number based on the reception signal and the predetermined incoming wave number, an incoming signal calculation unit 104 configured to calculate an incoming signal for each of one or more arrival directions in a case of a certain incoming wave number based on the incoming wave number and the one or more arrival directions, and an incoming wave number estimation unit 106 configured to estimate an incoming wave number of the reception signal based on levels of the incoming signals in a plurality of arrival directions. Thus, the estimation accuracy of the incoming wave number is improved.

Additionally, the communication device 10 further includes an average calculation unit 105 configured to calculate an average incoming signal obtained by averaging the incoming signals for each arrival direction by the predetermined incoming wave number, and the incoming wave number estimation unit 106 estimates the incoming wave number of the reception signal based on the average incoming signal and a predetermined threshold value of the average incoming signal. This makes it possible to remove noise generated when an incorrect incoming wave number is assumed, thereby improving the estimation accuracy of the incoming wave number.

In the communication device 10, the arrival direction calculation unit 103 calculates the arrival direction by an AF method. As a result, even when the correlation among a plurality of incoming signals is high, it is possible to calculate the arrival direction with high accuracy and to improve the estimation accuracy of the incoming wave number.

In the communication device 10, the arrival direction calculation unit 103 may calculate the arrival direction by a MODE method. This makes it possible to calculate the arrival direction with high accuracy even when the correlation among the plurality of incoming signals is high, thereby improving the estimation accuracy of the incoming wave number.

In the communication device 10, the predetermined threshold value is calculated by constant false alarm rate processing. As a result, it is possible to set the threshold value that does not cause erroneous detection of a signal, and thus estimation of the incoming wave number becomes more accurate.

A communication device 50 according to the second embodiment further includes a transmission signal generation unit 502 configured to generate a transmission signal, a transmission antenna 501 configured to transmit the transmission signal as a transmission wave to a target object, an intermediate frequency signal conversion unit 503 configured to mix the transmission signal and the reception signal and to convert the mixed signal into an intermediate frequency signal having an intermediate frequency, a distance/velocity calculation unit 504 configured to calculate a distance to the target object based on the intermediate frequency signal, and a position calculation unit 505 configured to calculate a position of the target object based on the distance and the arrival direction.

Thus, since the position of the target object can be estimated based on the incoming wave number more accurately estimated by the incoming wave number estimation unit 106, the resolution and accuracy of the communication device 50 as a radar are improved.

The communication device 10A further includes a control unit 602 configured to generate a control signal for controlling a reception direction of a reception wave or a transmission direction of a transmission wave based on the arrival direction. This makes it possible to control the directivity of the antenna 101, thereby improving the communication efficiency. It is also possible to control the directivity of a transmission antenna 601, and the communication efficiency is improved.

Note that the above-described embodiments are intended to facilitate understanding of the present disclosure, and are not to be construed as limiting the present disclosure thereto. The present disclosure can be changed/improved without departing from the gist thereof, and the present disclosure includes equivalents thereof. That is, those skilled in the art may make appropriate design modifications to the embodiments, and such modifications are also included in the scope of the present disclosure as long as they have the features of the present disclosure. For example, elements included in each embodiment, arrangement thereof, conditions, and the like are not limited to those exemplified and can be appropriately changed. In addition, each embodiment is merely an example, and it is needless to say that partial replacement or combination of configurations shown in different embodiments can be made, and these are also included in the scope of the present disclosure as long as they have the features of the present disclosure.

REFERENCE SIGNS LIST

10, 10A, 50 COMMUNICATION DEVICE
101 ANTENNA
102 A/D CONVERSION UNIT
103 ARRIVAL DIRECTION CALCULATION UNIT
104 INCOMING SIGNAL CALCULATION UNIT
105 AVERAGE CALCULATION UNIT
106 INCOMING WAVE NUMBER ESTIMATION UNIT
501 TRANSMISSION ANTENNA
502 TRANSMISSION SIGNAL GENERATION UNIT
503 INTERMEDIATE FREQUENCY SIGNAL CONVERSION UNIT
504 DISTANCE/VELOCITY CALCULATION UNIT
505 POSITION CALCULATION UNIT
60 COMMUNICATION SYSTEM
602 CONTROL UNIT

The invention claimed is:

1. A communication device comprising:
an antenna; and
circuitry configured to:
calculate an arrival direction of a reception signal received from the antenna in a case of a predetermined incoming wave number based on the reception signal and the predetermined incoming wave number;
calculate an incoming signal for each of one or more arrival directions in a case of an incoming wave number based on the incoming wave number and the one or more arrival directions; and
estimate an incoming wave number of the reception signal based on levels of the incoming signals in a plurality of the arrival directions.

2. The communication device according to claim 1, wherein the circuitry is further configured to:
calculate an average incoming signal obtained by averaging the incoming signals for each arrival direction by the predetermined incoming wave number; and
estimate the incoming wave number of the reception signal based on the average incoming signal and a predetermined threshold value of the average incoming signal.

3. The communication device according to claim 1, wherein the circuitry is further configured to calculate the arrival direction by an Annihilating Filter (AF) method.

4. The communication device according to claim 1, wherein the circuitry is further configured to calculate the arrival direction by a Method Of Direction Estimation (MODE).

5. The communication device according to claim 1, wherein the predetermined threshold value is calculated by constant false alarm rate processing.

6. The communication device according to claim 1, wherein the antenna is a reception antenna configured to receive, as the reception signal, an incoming wave generated by reflection of a transmission wave from a target object, and
the communication device further comprises:
a transmission signal generator configured to generate a transmission signal; and
a transmission antenna configured to transmit the transmission signal to the target object as the transmission wave,
wherein the circuitry is further configured to:
mix the transmission signal and the reception signal and to convert the mixed signal into an intermediate frequency signal having an intermediate frequency;
calculate a distance to the target object based on the intermediate frequency signal; and
calculate a position of the target object based on the distance and the arrival direction.

7. The communication device according to claim 1, wherein the antenna is a reception antenna configured to receive, as the reception signal, an incoming wave generated by reflection of a transmission wave from a target object, and
the communication device further comprises:
a transmission signal generator configured to generate a transmission signal; and
a transmission antenna configured to transmit the transmission signal to the target object as the transmission wave, wherein the circuitry is further configured to generate a control signal for controlling a reception direction of a reception wave including the incoming wave generated by the reflection of the transmission wave from the target object or a transmission direction of the transmission wave based on the arrival direction.

8. The communication device according to claim 2, wherein the circuitry is further configured to calculate the arrival direction by an Annihilating Filter (AF) method.

9. The communication device according to claim 2, wherein the circuitry is further configured to calculate the arrival direction by a Method Of Direction Estimation (MODE).

10. The communication device according to claim 2, wherein the predetermined threshold value is calculated by constant false alarm rate processing.

11. A communication method on a communications device comprising:
    calculating an arrival direction of a reception signal received from an antenna in a case of a predetermined incoming wave number based on the reception signal and the predetermined incoming wave number;
    calculating an incoming signal for each of one or more arrival directions in a case of an incoming wave number based on the incoming wave number and the one or more arrival directions; and
    estimating an incoming wave number of the reception signal based on levels of the incoming signals in a plurality of the arrival directions.

12. The communication method according to claim 11, the method further comprising:
    calculating an average incoming signal obtained by averaging the incoming signals for each arrival direction by the predetermined incoming wave number; and
    estimating the incoming wave number of the reception signal based on the average incoming signal and a predetermined threshold value of the average incoming signal.

13. The communication method according to claim 11, the method further comprising calculating the arrival direction by an Annihilating Filter (AF) method.

14. The communication method according to claim 11, the method further comprising calculating the arrival direction by a Method Of Direction Estimation (MODE).

15. The communication method according to claim 11, wherein the predetermined threshold value is calculated by constant false alarm rate processing.

16. The communication method according to claim 11, wherein the antenna is a reception antenna configured to receive, as the reception signal, an incoming wave generated by reflection of a transmission wave from a target object, and
wherein the method further comprises:
    generating a transmission signal;
    transmitting the transmission signal to the target object as the transmission wave;
    mixing the transmission signal and the reception signal and converting the mixed signal into an intermediate frequency signal having an intermediate frequency;
    calculating a distance to the target object based on the intermediate frequency signal; and
    calculating a position of the target object based on the distance and the arrival direction.

17. The communication device according to claim 11, wherein the antenna is a reception antenna configured to receive, as the reception signal, an incoming wave generated by reflection of a transmission wave from a target object, and
wherein the method further comprises:
    generating a transmission signal;
    transmitting the transmission signal to the target object as the transmission wave; and
    generating a control signal for controlling a reception direction of a reception wave including the incoming wave generated by the reflection of the transmission wave from the target object or a transmission direction of the transmission wave based on the arrival direction.

18. The communication method according to claim 12, the method further comprising calculating the arrival direction by an Annihilating Filter (AF) method.

19. The communication method according to claim 12, the method further comprising calculating the arrival direction by a Method Of Direction Estimation (MODE).

20. The communication method according to claim 12, wherein the predetermined threshold value is calculated by constant false alarm rate processing.

* * * * *